(12) United States Patent
Nagayasu et al.

(10) Patent No.: US 7,488,461 B2
(45) Date of Patent: Feb. 10, 2009

(54) EXHAUST GAS TREATMENT SYSTEM AND EXHAUST GAS TREATMENT METHOD

(75) Inventors: Hiromitsu Nagayasu, Hyogo-ken (JP); Yasutoshi Ueda, Hyogo-ken (JP); Morio Kagami, Hyogo-ken (JP); Toshihide Noguchi, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 349 days.

(21) Appl. No.: 11/406,422

(22) Filed: Apr. 19, 2006

(65) Prior Publication Data

US 2006/0239881 A1   Oct. 26, 2006

(30) Foreign Application Priority Data

Apr. 26, 2005 (JP) ............................. 2005-128045
Feb. 28, 2006 (JP) ............................. 2006-052919

(51) Int. Cl.
  *B01D 53/50* (2006.01)
  *B01D 53/68* (2006.01)
  *B01D 53/64* (2006.01)
  *B01D 53/48* (2006.01)
  *B01D 53/74* (2006.01)
  *B01D 53/78* (2006.01)
  *B01D 53/79* (2006.01)

(52) U.S. Cl. ................... 423/210; 423/220; 423/225; 423/232; 423/240 R; 423/243.01; 423/243.08; 422/168; 422/169; 422/170

(58) Field of Classification Search ................ 422/168, 422/169, 170; 423/210, 220, 225, 232, 240 R, 423/243.01, 243.08
See application file for complete search history.

(56) References Cited

U.S. PATENT DOCUMENTS

| 6,126,910 | A | 10/2000 | Wilhelm et al. |
| 6,803,025 | B2 | 10/2004 | Meserole et al. |
| 2004/0109802 | A1 | 6/2004 | Meserole et al. |
| 2004/0208809 | A1 | 10/2004 | D'Alesandro |
| 2005/0112044 | A1* | 5/2005 | Kuma et al. ................ 423/210 |

FOREIGN PATENT DOCUMENTS

| CN | 1073374 | 6/1993 |
| CN | 1438914 | 8/2003 |
| EP | 0 552 660 A1 | 7/1993 |

(Continued)

OTHER PUBLICATIONS

Korean Office Action dated Apr. 10, 2007, Application No. 10-2006-36508.

(Continued)

*Primary Examiner*—Timothy C Vanoy
(74) *Attorney, Agent, or Firm*—Westerman, Hattori, Daniels & Adrian, LLP.

(57) ABSTRACT

An exhaust gas treatment system is provided that can sufficiently remove pollutants such as $SO_3$ contained in combustion exhaust gas at low cost. In the exhaust gas treatment system for removing pollutants such as $SO_3$ contained in combustion exhaust gas, there is provided dissolved salt aqueous solution sprays 35A, 35B, and 35C, that spray an $Na_2SO_4$ aqueous solution obtained from desulfurization effluent of a wet desulfurization system, into a flue though which the combustion exhaust gas flows.

10 Claims, 6 Drawing Sheets

FOREIGN PATENT DOCUMENTS

| | | |
|---|---|---|
| JP | 10-156136 | 6/1998 |
| JP | 2002-273159 | 9/2002 |
| JP | 3564366 | 9/2004 |
| KR | 2001-0044303 | 6/2001 |
| WO | WO 01/93988 A1 | 12/2001 |

OTHER PUBLICATIONS

Chinese Office Action dated Oct. 12, 2007, Application No. 2006100777167.

* cited by examiner

EXHAUST GAS TREATMENT SYSTEM AND EXHAUST GAS TREATMENT METHOD

BACKGROUND OF THE INVENTION

1. Field of the Invention

The present invention relates to an exhaust gas treatment system and an exhaust gas treatment method for removing pollutants such as $SO_3$ in combustion exhaust gas.

2. Description of Related Art

The combustion exhaust gas produced at the time of combustion of fossil fuel or wastes in a combustion furnace, contains pollutants such as sulfur trioxide ($SO_3$), hydrogen fluoride (HF), hydrogen chloride (HCl), mercury chloride (HgCl), hydrogen sulfide ($H_2S$), carbonyl sulfide (COS) and so forth. Since these pollutants have a damaging effect on the environment when discharged into the atmosphere, they are required by laws and regulations to be treated to be below a predetermined concentration. Up until now, various kinds of exhaust gas treatment system for achieving this have been proposed.

$SO_3$ is described as an example of the pollutants.

$SO_3$ is produced primarily when some portion of $SO_2$, which has been produced in combustion of fuel containing sulfur (heavy oil, coal and so forth), is oxidized under a high temperature environment. Therefore, the $SO_3$ content ratio to $SO_2$ is a few percent. However, since $SO_3$ causes blockage and corrosion of air heaters, and corrosion of flues, and causes bluish smoke when cooled and discharged from a stack, it is preferable to suppress its discharge concentration to a few ppm or less.

As a method of removing $SO_3$, the ammonia gas injection method, in which ammonia gas is injected into combustion exhaust gas, is commonly known.

In the ammonia gas injection method, ammonium sulfate and dust are produced as products from ammonia gas and the combustion exhaust gas. The ammonium sulfate is generally collected as a solid state substance by a dry electrostatic precipitator. However, since heavy metals contained in fuels such as heavy oil are also collected with the ammonium sulfate, it needs to be separately treated before it is discharged into the environment. Accordingly, the ammonia injection method has a disadvantage of facility cost and operation cost.

Moreover, since a large amount of ammonia gas is injected in order to produce ammonium sulfate, ammonia is occasionally incorporated into desulfurization effluent of a wet desulfurization system provided on the downstream side. In this case, desulfurization effluent treatment is required to meet environmental standards.

Moreover, since ammonia gas needs to be constantly supplied, a large consumption of ammonia gas is an obstacle to operation cost reduction.

On the other hand, in some cases, an wet type electrostatic precipitator or a dielectric flue gas treatment system (Japanese Patent No. 3564366) is installed on the downstream side of a flue in order to remove dust produced by ammonia injection, and ash in the combustion exhaust gas.

A wet electrostatic precipitator and a dielectric flue gas treatment system also remove $SO_3$ while removing dust. However, even when using these, in the case of highly concentrated $SO_3$, the use of a wet electrostatic precipitator or a dielectric flue gas treatment system having an economically feasible treatment capacity may not achieve a sufficient level of $SO_3$ removal.

BRIEF SUMMARY OF THE INVENTION

The present invention takes into consideration the above circumstances, and has an object of providing an exhaust gas treatment system and an exhaust gas treatment method that can sufficiently remove pollutants such as $SO_3$ contained in combustion exhaust gas, at low cost.

In order to solve the above problems, the exhaust gas treatment system and exhaust gas treatment method of the present invention employ the following solutions.

That is to say, the exhaust gas treatment system according to the present invention is an exhaust gas treatment system for removing pollutants contained in combustion exhaust gas, such as sulfur trioxide, hydrogen fluoride, hydrogen chloride, mercury chloride, hydrogen sulfide, and carbonyl sulfide, wherein there is provided a spraying device that sprays an aqueous solution containing a dissolved salt of a chloride, a hydroxide, a sulfate or a carbonate of any one of Na, K, Mg, and Ca, into a flue through which the combustion exhaust gas flows.

As a result of dedicated investigation, the present inventors have discovered that if the aqueous solution contains a dissolved salt of a sulfate or a carbonate of any one Na, K, Mg, and Ca, then pollutants such as sulfur trioxide, hydrogen fluoride, hydrogen chloride, mercury chloride, hydrogen sulfide, and carbonyl sulfide can be effectively removed.

The aqueous solution containing a dissolved salt of a sulfate or a carbonate of any one of Na, K, Mg, and Ca (for example as a reaction product of a treatment step of some kind) can be obtained comparatively easily and at low cost. Therefore the exhaust gas treatment can be executed easily and at low cost without the use of expensive chemicals.

As dissolved salts, there are NaCl, NaOH, $Na_2SO_4$, $Na_2CO_3$, KCl, KOH, $K_2SO_4$, $K_2CO_3$, $KHCO_3$, $MgCl_2$, $MgSO_4$, and $CaCl_2$.

As sulfur oxides contained in the combustion exhaust gas, apart from $SO_3$ there is $SO_2$. However the present invention is particularly suitable for $SO_3$ treatment, and is not for removing $SO_2$.

Moreover, sulfur trioxide is given to represent a pollutant, but the invention can also be applied to other pollutants. Examples are hydrogen fluoride (HF), hydrogen chloride (HCl), mercury chloride (HgCl), hydrogen sulfide ($H_2S$), carbonyl sulfide (COS), and so forth.

For a spraying device, a two-fluid nozzle is preferable as it is able to atomize the liquid droplets to be sprayed.

The mechanism in general for removing pollutants is considered as follows.

The aqueous solution containing a dissolved salt becomes fine droplets when the aqueous solution is sprayed. The water around the dissolved salt in the fine droplets is vaporized by the combustion exhaust gas. Accordingly, since the water in the fine droplets is vaporized to form dried particles of the dissolved salt, fine particles of the dissolved salt can be obtained. Furthermore, the pollutants such as $SO_3$ are brought into contact with the dried fine particles of the dissolved salt, and are adsorbed and immobilized to be removed from the gas.

That is to say, since the spraying of the aqueous solution containing the dissolved salt allows formation of a large number of small dried particles of the dissolved salt, a surface area which is necessary for adsorbing the pollutants, such as $SO_3$, contained in the combustion exhaust gas is secured, and the adsorption and immobilization of the pollutants is accelerated.

Furthermore, the exhaust gas treatment method is provided with a wet desulfurization system, and the aqueous solution is preferably the desulfurization effluent of the wet desulfurization system.

In the case where the sodium hydroxide method or the magnesium hydroxide method is used for the wet desulfurization system, $Na_2SO_4$ and $MgSO_4$, which are sulfates of Na and Mg, are contained in the desulfurization effluent. By spraying such desulfurization effluent, pollutants such as $SO_3$ can be removed without consuming new chemicals. Thus, extremely low cost exhaust gas treatment becomes possible.

Furthermore, the outlet temperature of the spraying device of the gas treatment system is 130° C. or more, and preferably 140° C. or more.

Since it is necessary to vaporize the water while the droplets of the aqueous solution sprayed from the spraying device are being dispersed, an environment in which the temperature is greater than or equal to the temperature at which water vaporizes is preferable. Furthermore, the temperature is preferably greater than or equal to the dew-point temperature of the pollutants such as $SO_3$, which reacts with the dissolved salt. This is because when the temperature is lower than the dew-point temperature, $SO_3$ gas, for example, becomes $SO_3$ mist, which is not readily adsorbed to dried fine particles of the dissolved salt, degrading the removing capability. Therefore, the outlet temperature of the spraying device is 130° C. or more, and preferably 140° C. or more.

Furthermore, it is preferable that the diameter of the droplets of the sprayed solution be such that the water can be vaporized while the droplets of the aqueous solution sprayed are being dispersed. For example, the diameter is preferably from 10 μm to 100 μm, and more preferably from about 20 μm to about 50 μm.

Furthermore, the exhaust gas treatment system of the present invention is provided with an air heater that heats air which is supplied to a combustion furnace, by an amount of heat obtained from combustion exhaust gas, and the spraying device is provided on an upstream side of the air heater.

If, for example, sulfur trioxide is contained in the combustion exhaust gas, then the air heater will progressively corrode due to sulfuric acid produced from the sulfur trioxide. In the present invention, by positioning the spraying device on the upstream side of the air heater, pollutants such as sulfur trioxide are removed on the upstream side of the air heater, and corrosion of the air heater is prevented.

Moreover, since the upstream side of the air heater is on the side before the sensible heat is removed from the combustion exhaust gas by the air heater, it is maintained at a comparatively high temperature (for example, 300 to 350° C.). As a result, vaporization of the water component of the sprayed droplets is promoted, and the removal efficiency of the pollutants is improved.

Furthermore, the exhaust gas treatment system of the present invention is provided with: an air heater that heats air which is supplied to a combustion furnace, by an amount of heat obtained from combustion exhaust gas; and a dry electrostatic precipitator provided on a downstream side of the air heater, and the spraying device is provided between the air heater and the dry electrostatic precipitator.

If, for example, sulfur trioxide is contained in the combustion exhaust gas, then the dry electrostatic precipitator will progressively corrode due to sulfuric acid produced from the sulfur trioxide. In the present invention, the spraying device is provided between the air heater and the dry electrostatic precipitator, and pollutants are removed on the upstream side of the dry electrostatic precipitator, and corrosion of the dry electrostatic precipitator is prevented.

Moreover, compared to the method of removing sulfur trioxide by injecting ammonia gas into the upstream side of the dry electrostatic precipitator, treatment of the products produced with the pollutants in the combustion exhaust gas becomes simpler. That is to say, in the ammonia gas injection method, a separate step is required for treatment heavy metals contained in the ammonium sulfate produced as by-products. In the present invention, since the present invention uses a dissolved salt containing any one of Na, K, Mg and Ca (for example, $Na_2SO_4$ or $MgSO_4$), instead of ammonia, an ammonium sulfate treatment step is not required. Moreover, since the ammonia gas injection method is not used, ash dust formation can be prevented.

Furthermore, according to the exhaust gas treatment system of the present invention, there is provided: an air heater that heats air which is supplied to a combustion furnace, by an amount of heat obtained from combustion exhaust gas; a dry electrostatic precipitator provided on a downstream side of the air heater; and a wet desulfurization system provided on a downstream side of the dry electrostatic precipitator, and the spraying device is provided between the dry electrostatic precipitator and the wet desulfurization system, and in an immediate vicinity of the wet desulfurization system.

Since dissolved salt is used, the product produced between the pollutants in the combustion exhaust gas is easily dissolved in the desulfurization effluent of the wet desulfurization system. Moreover, since the spraying device is provided in the immediate vicinity of the wet desulfurization system, the product flows into the desulfurization effluent storage part of the wet desulfurization system. The products which have flowed into the desulfurization effluent storage part are dissolved in the desulfurization effluent and are treated together with the desulfurization effluent. Therefore, a separate product treatment step is not required, and the facility can be simplified.

For example, in the case of a wet desulfurization system which uses the sodium hydroxide method, if $Na_2SO_4$ is used as the dissolved salt, $SO_3$ in the combustion exhaust gas is removed from the gas by being adsorbed and immobilized to the dried fine particles of the dissolved salt. Moreover, the reaction according to the following formula between part of the dried particles of the dissolved salt ($Na_2SO_4$) and $SO_3$ proceeds to produce $NaHSO_4.H_2O$ (solid). Here, $Na_2SO_4$ and $NaHSO_4.H_2O$, both of which are soluble, are dissolved in the desulfurization system on the downstream side.

$$Na_2SO_4+SO_3+2H_2O \rightarrow 2NaHSO_4.H_2O$$

Thus, there is an advantage in that solid state substance treatment such as with the ammonia gas injection method is not required.

Furthermore, the exhaust gas treatment system of the present invention is provided with: an air heater that heats air which is supplied to a combustion furnace, by the amount of heat obtained from the combustion exhaust gas; a dry electrostatic precipitator provided on a downstream side of the air heater; and a wet desulfurization system provided on a downstream side of the dry electrostatic precipitator, and the spraying device is provided in any of two places: on an upstream side of the air heater; between the air heater and the dry electrostatic precipitator; and between the dry electrostatic precipitator and the wet desulfurization system, and in an immediate vicinity of the wet desulfurization system.

By installing the spraying device in two places, concentration of pollutants can be drastically reduced.

Moreover, if one of the spraying positions is on the upstream side of the air heater, the combustion exhaust gas temperature on the upstream side of the air heater can be maintained at a high temperature by the combustion furnace on the upstream side. Therefore a drop in the combustion exhaust gas temperature on the downstream side of the air heater can be prevented, and pollutant removal efficiency at the spraying position on the downstream side of the air heater can be maintained at a high level.

Furthermore, the exhaust gas treatment system of the present invention is provided with a wet electrostatic precipitator or a dielectric flue gas treatment system.

Since pollutants in the combustion exhaust gas can also be removed by the wet electrostatic precipitator or the dielectric flue gas treatment system, the apparatus accompanying the spraying device for spraying dissolved salts, can be made compact.

In particular, since the dielectric flue gas treatment system excels in $SO_3$ removal, it is suitable for the purpose of $SO_3$ removal.

Moreover, the exhaust gas treatment system of the present invention is an exhaust gas treatment method for removing pollutants contained in combustion gas, such as sulfur trioxide, hydrogen fluoride, hydrogen chloride, mercury chloride, hydrogen sulfide, and carbonyl sulfide, and comprises spraying an aqueous solution that contains a dissolved salt of a chloride, a hydroxide, a sulfate or a carbonate of any one of Na, K, Mg, and Ca, into a flue through which the combustion exhaust gas flows.

The aqueous solution containing the dissolved salt of a chloride, a hydroxide, a sulfate or a carbonate of any one of Na, K, Mg, and Ca (for example as a reaction product of a treatment step of some kind) can be obtained comparatively easily and at low cost. Therefore the exhaust gas treatment can be executed easily and at low cost.

As dissolved salts, there are NaCl, NaOH, $Na_2SO_4$, $Na_2CO_3$, KCl, KOH, $K_2SO_4$, $K_2CO_3$, $KHCO_3$, $MgCl_2$, $MgSO_4$, and $CaCl_2$.

As sulfur oxides contained in the combustion exhaust gas, apart from $SO_3$ there is $SO_2$. However the present invention is particularly suitable for $SO_3$ treatment, and is not for removing $SO_2$.

Moreover, sulfur trioxide is given to represent a pollutant, but the invention can also be applied to other pollutants. Examples are hydrogen fluoride (HF), hydrogen chloride (HCl), mercury chloride (HgCl), hydrogen sulfide ($H_2S$), carbonyl sulfide (COS), and so forth.

The mechanism in general for removing pollutants is considered as follows.

The aqueous solution containing a dissolved salt becomes fine droplets when the aqueous solution is sprayed. The water around the dissolved salt in the fine droplets is vaporized by the combustion exhaust gas. Accordingly, since the water in the fine droplets is vaporized to form dried particles of the dissolved salt, fine particles of the dissolved salt can be obtained. Furthermore, the pollutants such as $SO_3$ are brought into contact with the dried fine particles of the dissolved salt, and are adsorbed and immobilized to be removed from the gas.

That is to say, since the spraying of the aqueous solution containing the dissolved salt allows formation of a large number of small dried particles of the dissolved salt, a surface area which is necessary for adsorbing the pollutants, such as $SO_3$, contained in the combustion exhaust gas is secured, and the adsorption and immobilization of the pollutants is accelerated.

According to the present invention, the following effects can be obtained.

Since pollutants such as $SO_3$ can be removed using an aqueous solution which contains a dissolved salt of a sulfate or a carbonate of any one of Na, K, Mg, and Ca, the exhaust gas treatment can be performed without having to inject expensive chemicals.

Furthermore, when the aqueous solution is supplied by the desulfurization effluent, the exhaust gas treatment can be performed with a simple construction at low cost.

DETAILED DESCRIPTION OF THE INVENTION

Hereunder, embodiments according to the present invention are described, with reference to the drawings.

First Embodiment

Figure 1:
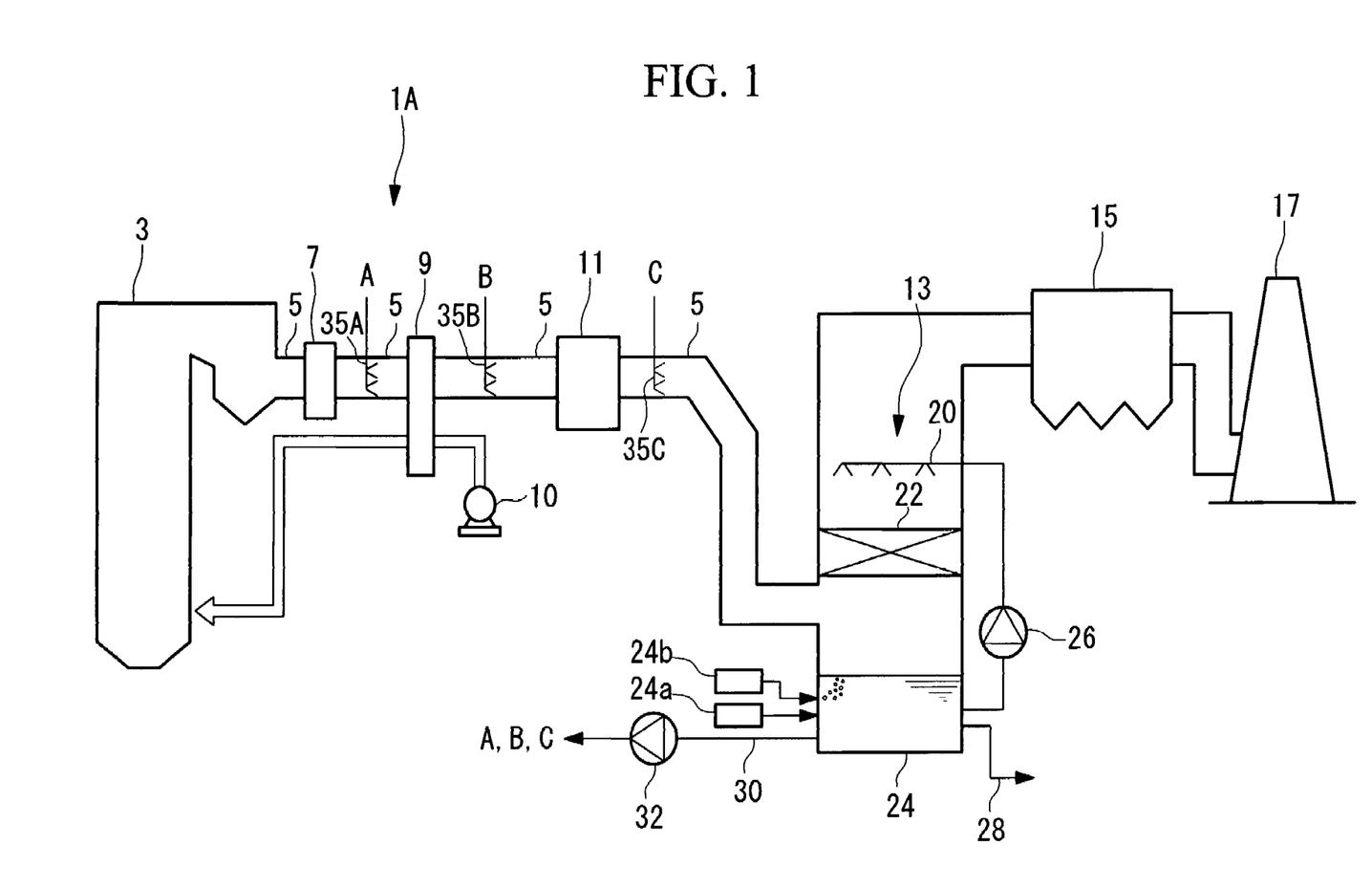
FIG. 1 is a schematic diagram showing an exhaust gas treatment system according to a first embodiment of the present invention.

Hereunder, a first embodiment of the present invention is described, with reference to FIG. 1.

The present embodiment is an exhaust gas treatment system to which is applied a wet desulfurization system using the sodium hydroxide method.

FIG. 1 shows the exhaust gas treatment system according to the present invention.

An exhaust gas treatment system 1A is installed in a flue 5 on the downstream side of a boiler (combustion furnace) 3, and is provided with a denitrificator 7, an air heater 9, a dry electrostatic precipitator 11, a wet desulfurization system 13, a dielectric flue gas treatment system 15, and a stack 17.

The boiler 3 is for example a heavy oil combustion boiler for combusting heavy oil containing a relatively large amount of sulfur.

The denitrificator 7 is for removing nitrogen oxide (NOx) contained in the combustion exhaust gas from the boiler 3.

The air heater 9 is for performing heat exchange between the combustion exhaust gas and the combustion air supplied by a forced draft fan 10. As a result, the combustion air is heated by the sensible heat of the combustion exhaust gas, and then supplied to the boiler 3.

The dry electrostatic precipitator 11 is for scavenging the dust in the combustion exhaust gas, by electrostatic force.

The wet desulfurization system 13 is provided with; an absorbent solution spray 20 for spraying a solution which contains absorbent NaOH, a packed bed 22 arranged under the absorbent solution spray 20, and a storage part 24 provided under the packed bed 22.

The packed bed 22 is of a construction provided with resin packing material for example.

An absorbent solution recirculation pump 26 is provided between the absorbent solution spray 20 and the storage part 24, and the absorbent solution in the storage part 24 is pumped up by the absorbent solution recirculation pump 26.

NaOH solution is supplied from a NaOH solution supply device 24a into the storage part 24, and air is supplied by an air supply device 24b.

In the packed bed 22, the absorbent solution which has been sprayed from the spray 20 absorbs the $SO_2$ in the combustion exhaust gas. The $SO_2$ absorbed in the absorbent solution becomes $NaHSO_3$, and reacts with oxygen to produce $Na_2SO_4$. The desulfurization effluent which contains this $Na_2SO_4$ is discharged to the outside through a discharge pipe 28.

$SO_3$ does not chemically react with the absorbent solution in the wet desulfurization system 13. However, a minute amount of $SO_3$ is removed due to its flocculation or its collision with particles of the absorbent solution.

Not only $Na_2SO_4$ but also $NaHSO_3$ is dissolved in the storage part 24. However, preferably this is actively oxidized using the air supply device 24b, to convert the $NaHSO_3$ into $Na_2SO_4$.

The dielectric flue gas treatment system 15 is for dielectrically polarizing dielectric particles of sprayed water or the like, so as to scavenge pre-charged dust or $SO_3$ by the Coulomb force which acts between each of the dielectric particles.

A wet electrostatic precipitator may be used instead of the dielectric flue gas treatment system 15.

In the present invention, the desulfurization effluent stored in the storage part 24 of the wet desulfurization system 13 is used to remove $SO_3$.

The desulfurization effluent mainly contains $Na_2SO_4$ aqueous solution in which $Na_2SO_4$ as the dissolved salt is dissolved in water, and partially also contains NaOH solution supplied by the NaOH solution supply device 24a.

The desulfurization effluent is transferred to the upstream side of the wet desulfurization system 13 through an extraction pipe 30, by means of an extraction pump 32, and is sprayed into the flue 5 by dissolved salt sprays (spraying device) 35A, 35B, and 35C. The desulfurization effluent is preferably sprayed by a two-fluid nozzle which atomizes liquid using pressurized air. The droplet diameter of the desulfurization effluent to be sprayed is from 10 μm to 100 μm, preferably 20 μm to 50 μm, and more preferably 25 μm to 35 μm.

$SO_3$ in the combustion exhaust gas is adsorbed and immobilized to the dried fine particles of the dissolved salt by the $Na_2SO_4$ aqueous solution contained in the desulfurization effluent, and is removed from the gas. Moreover, the reaction according to the following formula between part of the dried particles of the dissolved salt ($Na_2SO_4$) and $SO_3$ proceeds to produce $NaHSO_4 \cdot H_2O$ (solid). Here, $Na_2SO_4$ and $NaHSO_4 \cdot H_2O$, both of which are soluble, are dissolved in the desulfurization system on the downstream side.

$$Na_2SO_4 + SO_3 + 2H_2O \rightarrow 2NaHSO_4 \cdot H_2O$$

Furthermore, $SO_2$ in the combustion exhaust gas is removed by the NaOH aqueous solution contained in the desulfurization effluent.

The position for spraying the desulfurization effluent is suitably selected from any of the following positions: a position A between the denitrificator 7 and the air heater 9; a position B between the air heater 9 and the dry electrostatic precipitator 11; and a position C between the dry electrostatic precipitator 11 and the wet desulfurization system 13. Naturally, two positions, such as the position A and the position B, or the position A and the position C, may be selected at the same time.

The temperature of the position A is approximately 300 to 350° C., the temperature of the position B is approximately 160 to 200° C., and the temperature of the position C is approximately 160 to 200° C.

Advantages of selecting each of the positions A to C are as follows.

In the case where the position A on the upstream side of the air heater 9 is selected as a position for spraying the desulfurization effluent, $SO_3$ is removed on the upstream side of the air heater 9. Accordingly, corrosion of the air heater 9 caused by sulfuric acid produced from sulfur trioxide in the combustion exhaust gas can be prevented.

Furthermore, since the upstream side of the air heater 9 is on the side before the sensible heat is removed from the combustion exhaust gas by the air heater 9, it is maintained at a comparatively high temperature (for example, 300 to 350° C.). As a result, water evaporation of $Na_2SO_4$ aqueous solution particles in the sprayed desulfurization effluent is promoted, and the removal efficiency of $SO_3$ is improved.

Since the position B is provided on the upstream side of the dry electrostatic precipitator 11, corrosion of the dry electrostatic precipitator 11 caused by sulfuric acid produced from sulfur trioxide in the combustion exhaust gas, can be prevented by spraying the desulfurization effluent.

Furthermore, compared to the conventionally used ammonia gas injection method, treatment of the product after scavenging the $SO_3$ is facilitated. That is to say, in the case where the desulfurization effluent is sprayed, the product becomes a water soluble sulfate, and compared to the ammonia gas injection method, which requires a step for treatment solid state products containing ammonium sulfate or heavy metals, the treatment becomes extremely simple. That is to say, the treatment of the product can be shared with the wet desulfurization system 13, and facility costs can be kept down. Moreover, ammonium sulfate, which, as a by-product, requires a complex treatment, is produced in the ammonia gas injection method. However, if the desulfurization effluent produced in the sodium hydroxide method is sprayed, there is an advantage in that the treatment becomes simpler although dust would be produced as a product.

Since the position C is provided in the immediate vicinity of the wet desulfurization system 13, the product produced with $SO_3$ flows to the downstream side together with the combustion exhaust gas, and then flows into the storage part 24. Accordingly, the products produced by the desulfurization effluent sprayed from the position C is scavenged by the wet desulfurization system 13, and after that, it is processed together with the desulfurization effluent, enabling the desulfurization effluent treatment facility to be shared.

Moreover, if the positions of spraying desulfurization effluent are selected to be the positions A and B, or the positions A and C, the concentration of $SO_3$ can be drastically reduced. For example, in the case where $SO_3$ cannot be removed to an allowable concentration level only at the position A, an additional desulfurization effluent spraying device may be provided at the position B or the position C.

When one of the spraying positions is the position A which is on the upstream side of the air heater 9, the temperature of the upstream side of the air heater 9 is maintained at the predetermined temperature by capacity control of the boiler 3 on the upstream side. Therefore a decrease in the combustion exhaust gas temperature caused by spraying the desulfurization effluent can be prevented to the greatest possible extent. Consequently a decrease in the combustion exhaust gas temperature is small at the position B or at the position C on the downstream side of the air heater 9, and the temperature level required for $SO_3$ removal can be maintained.

The exhaust gas treatment system 1A of the above construction is operated as described below.

In the following description, a case where dissolved salt sprays 35 are installed at the position A and the position B is described as an example.

When heavy oil containing a large amount of sulfur is combusted in the boiler 3, combustion exhaust gas which contains $SO_2$ is discharged into the flue 5 on the downstream side. $SO_2$ is partially oxidized (a few percent) in the high temperature section of boiler 3 or the denitrificator 7, and converted to $SO_3$.

A large proportion of $SO_3$ is removed at the position A by the desulfurization effluent which has been atomized by the dissolved salt spray 35A. Here, $SO_3$ is adsorbed and immobilized to the dried fine particles of the dissolved salt by spraying the desulfurization effluent containing the aqueous solution of $Na_2SO_4$, which is the dissolved salt, and is removed from the gas. Moreover, the reaction according to the following formula between part of the dried particles of the dissolved salt ($Na_2SO_4$) and $SO_3$ proceeds to produce $NaHSO_4 \cdot H_2O$ (solid).

$$Na_2SO_4 + SO_3 + 2H_2O \rightarrow 2NaHSO_4 \cdot H_2O$$

The temperature of the combustion exhaust gas at the position A is 300 to 350° C.

The combustion exhaust gas, from which a large proportion of $SO_3$ has been removed, passes through the air heater 9, and gives up a portion of its sensible heat to the combustion air supplied by the forced draft fan 10, and reaches the position B. At this time, the temperature of the combustion exhaust gas drops to approximately 160 to 200° C.

At the position B, the desulfurization effluent atomized by the dissolved salt spray 35B is sprayed again and the $SO_3$ is removed further. Thus, the solid state substance which is produced while $SO_3$ is removed is collected together with the dust in the combustion exhaust gas by the dry electrostatic precipitator 11, and is discharged to the outside.

The combustion exhaust gas, from which a large proportion of the $SO_3$ has been removed at the position A and the position B, flows into the wet desulfurization system 13.

In the wet desulfurization system 13, the $SO_2$ is removed by the absorbent solution sprayed by the absorbent solution spray 20. In the storage part 24, NaOH reacts with $SO_2$ to produce $Na_2SO_4$. The solubility of $Na_2SO_4$ is high, and the $Na_2SO_4$ is partially discharged to the outside through the discharge pipe 28 in an $Na_2SO_4$ aqueous solution state. Meanwhile, the other $Na_2SO_4$ aqueous solution is pumped up by the extraction pump 32 and transferred to each of the dissolved salt sprays 35A and 35B through the extraction pipe 30.

The combustion exhaust gas from which $SO_2$ has been removed in the wet desulfurization system 13, is introduced into the dielectric flue gas treatment system 15. Here the remaining dust, the $SO_3$ and so forth are removed, and then it is discharged to the outside through the stack 17.

According to the present embodiment, the following effect can be obtained.

The aqueous solution of $Na_2SO_4$ is sprayed to form fine droplets, and the water around $Na_2SO_4$ in the fine droplets is vaporized by the combustion exhaust gas. Thus, the particles of $Na_2SO_4$ are obtained, with which $SO_3$ is brought into contact to be adsorbed and immobilized to the particles, and $SO_3$ is removed from the gas. That is to say, since the spraying of the aqueous solution of $Na_2SO_4$ allows formation of a large number of small dried particles of $Na_2SO_4$, a surface area which is necessary for adsorbing $SO_3$ contained in the combustion exhaust gas is secured, and the adsorption and immobilization of $SO_3$ is accelerated.

Since the $SO_3$ is removed by the dissolved salt $Na_2SO_4$ aqueous solution, the $Na_2SO_4$ aqueous solution needs only to be supplied by the desulfurization effluent, and new chemical solutions do not need to be injected. Therefore, $SO_3$ removal can be achieved with an extremely simple construction at low cost.

Since the solubility of the reaction product of $Na_2SO_4$ and $SO_3$ is high, the product can be processed while it is in the aqueous solution state. Therefore, the treatment becomes extremely simple compared to the ammonia gas injection method which requires solid state substance treatment.

Since the ammonia gas injection method does not need to be employed for $SO_3$ removal, a treatment facility for the by-product produced by the ammonia gas injection method is no longer necessary, resulting in a cost reduction. Moreover, since ammonia gas does not need to be constantly supplied, operation cost can be kept down.

Since the desulfurization effluent is sprayed in two steps at the position A and at the position B, the $SO_3$ concentration can be drastically reduced.

Furthermore, the amount of $SO_3$ treatment which uses the desulfurization effluent can be reduced by combining with the dielectric flue gas treatment system 15 which can remove the predetermined amount of $SO_3$. Hence the equipment from the extraction pipe 30 through to the dissolved salt sprays 35A, 35 B, 35C can be constructed on a small scale.

In the present embodiment, the desulfurization effluent is used to obtain the $Na_2SO_4$ aqueous solution. However, separately produced $Na_2SO_4$ aqueous solution may be sprayed at the positions A to C to remove $SO_3$.

Moreover, in the present embodiment the wet desulfurization system 13 which uses the sodium hydroxide method has been described as an example. However, it can be similarly applied to a wet desulfurization system which uses the magnesium hydroxide method with $Mg(OH)_2$. In this case, $MgSO_4$ contained in the desulfurization effluent is used as the dissolved salt for $SO_3$ removal.

Furthermore, $Na_2SO_4$ and $MgSO4$ are exemplified as dissolved salts. However, a dissolved salt of a sulfate or a carbonate of any one of Na, K, Mg and Ca, can remove pollutants such as $SO_3$.

Moreover, $SO_3$ has been used as an example of the pollutants to be removed. However, hydrogen fluoride (HF), hydrogen chloride (HCl), mercury chloride (HgCl), hydrogen sulfide ($H_2S$), carbonyl sulfide (COS), and so forth can also be removed.

Second Embodiment

Figure 2:
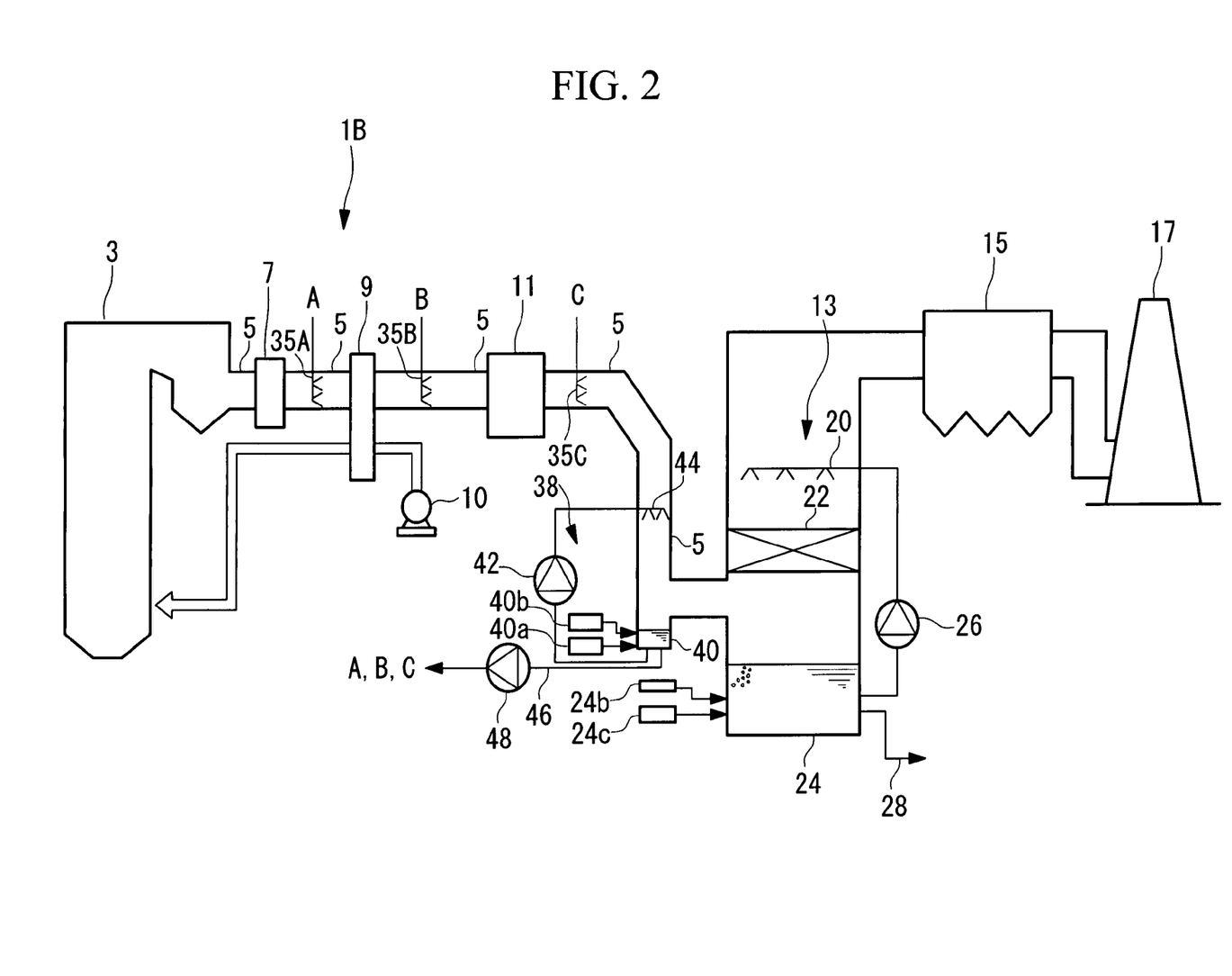
FIG. 2 is a schematic diagram showing an exhaust gas treatment system according to a second embodiment of the present invention.

Next, a second embodiment of the present invention is described, with reference to FIG. 2.

The present embodiment is an exhaust gas treatment apparatus to which a wet desulfurization system using the limestone gypsum method is applied.

Components which are same as those of the first embodiment are denoted by the same reference symbols, and their descriptions are omitted.

FIG. 2 shows the exhaust gas treatment system according to the present embodiment.

An exhaust gas treatment system 1B removes sulfur oxides, using limestone ($CaCO_3$) supplied from a limestone supply device 24c, as an absorbent. Since the product produced in the limestone gypsum method becomes poor solubility CaSO4, it is difficult to perform $SO_3$ removal using the desulfurization effluent as in the first embodiment.

Consequently, in the present embodiment, a second wet desulfurization system 38, which is smaller than the wet desulfurization system 13 and uses the sodium hydroxide method, is provided midway along a flue 5. The second wet desulfurization system 38 is provided with a second storage part 40 on the upstream side of a wet desulfurization system 13. An NaOH solution supply device 40a and an air supply device 40b are connected to this second storage part 40, so that NaOH solution and air are supplied to the second storage part 40. The NaOH solution supplied to the second storage part 40 is dissolved in an absorbent solution, and is sprayed into the flue 5 from a second absorbent solution spray 44 by a second absorbent recirculation pump 42. The desulfurization effluent containing $Na_2SO_4$ aqueous solution which has been produced inside the second storage part 40 is transferred to the upstream side of the second absorbent solution spray 44 through an extraction pipe 46, by means of an extraction pump 48, and is sprayed into the flue 5 by dissolved salt sprays (spraying device) 35A, 35B, and 35C.

In the present embodiment, the smaller-scaled second wet desulfurization system 38 which uses the sodium hydroxide method, is provided on the upstream side of the wet desulfurization system 13 which uses the limestone gypsum method, and dissolved salt $Na_2SO_4$ is produced, and the desulfurization effluent which mainly contains this $Na_2SO_4$ aqueous solution is sprayed into the flue 5 on the upstream side. As a result, $Na_2SO_4$ can be supplied for $SO_3$ removal without having to provide a large scale $Na_2SO_4$ production facility.

Moreover, the second wet desulfurization system 38 only needs to be an adequate scale to obtain the amount of $Na_2SO_4$ required for $SO_3$ removal. Since the $SO_3$ content in the combustion exhaust gas is a few percent of $SO_2$, the second wet desulfurizer 38 can be made significantly smaller than the wet desulfurization system 13.

Figure 3:
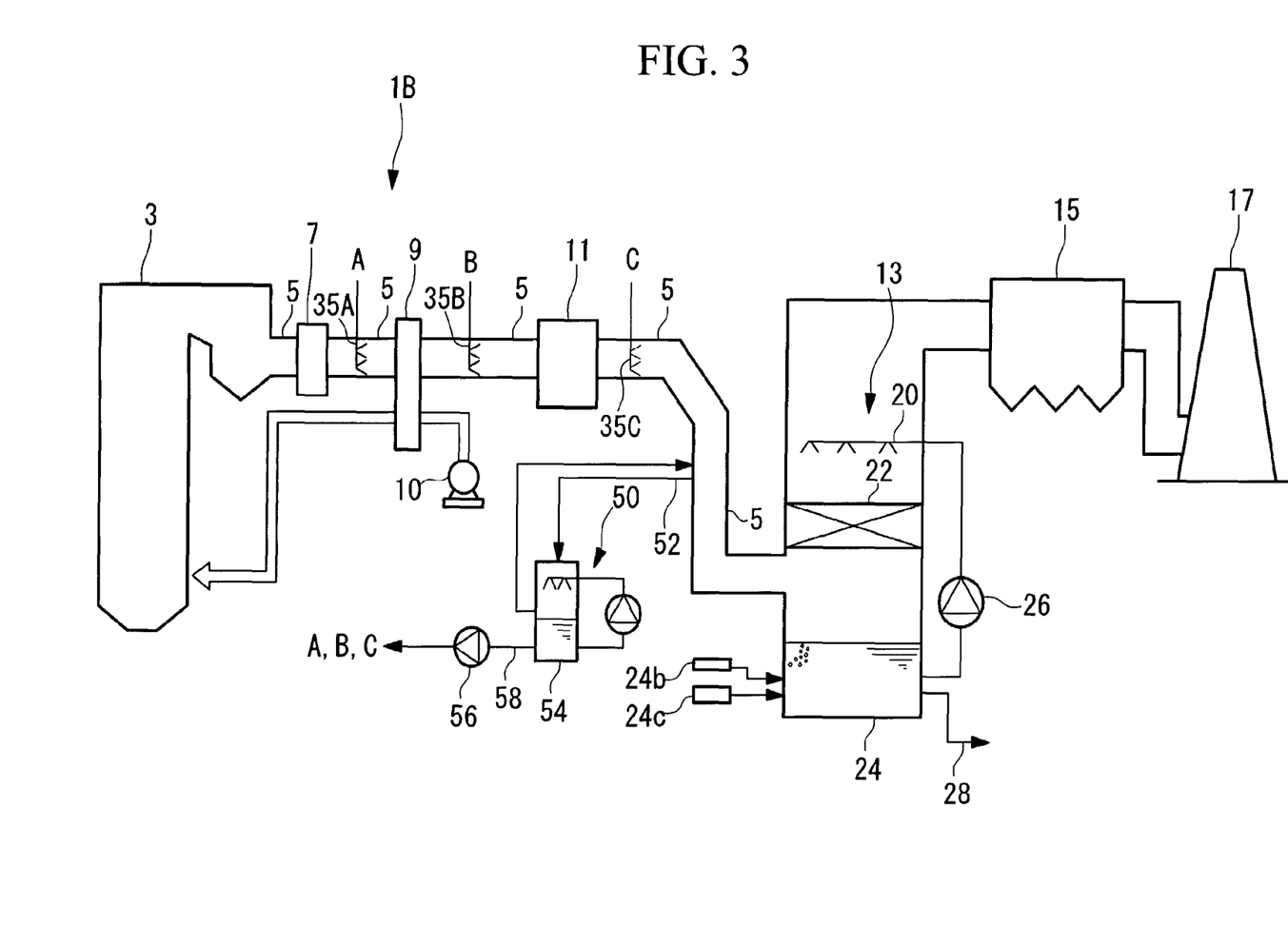
FIG. 3 is a schematic diagram showing a modified example of FIG. 2.

Moreover, as shown in FIG. 3, instead of the second wet desulfurization system 38 provided midway along the flue 5 shown in FIG. 2, a small-scaled third wet desulfurization system 50 which uses the sodium hydroxide method may be provided outside of the flue 5. In this case, a branch pipe 52 is connected to the flue 5 so as to introduce a portion of the combustion exhaust gas into the third wet desulfurization system 50. In the third wet desulfurization system 50, desulfurization is performed in the same manner as for the second wet desulfurization system 38, and the desulfurization effluent which contains $Na_2SO_4$ aqueous solution is produced in a third storage part 54. The desulfurization effluent is transferred to the dissolved salt sprays (spraying device) 35A, 35B, and 35C through an extraction pipe 58 by an extraction pump 56.

In the present embodiment, the sodium hydroxide method is used in the second wet desulfurization system 38 and in the third wet desulfurization system 50. However, the magnesium hydroxide method may be used.

Furthermore, not only the dissolved salts $Na_2SO_4$ and MgSO4, but also dissolved salts of a sulfate or a carbonate of any one of Na, K, Mg and Ca, can remove pollutants such as $SO_3$.

Moreover, $SO_3$ has been used as an example of pollutants to be removed. However, hydrogen fluoride (HF), hydrogen chloride (HCl), mercury chloride (HgCl), hydrogen sulfide ($H_2S$), carbonyl sulfide (COS), and so forth can also be removed.

Furthermore, $Na_2SO_4$ aqueous solution or MgSO4 aqueous solution may be supplied directly to each of the positions A to C without using the second wet desulfurization system 38 and the third wet desulfurization system 50.

EXAMPLES

Figure 4:
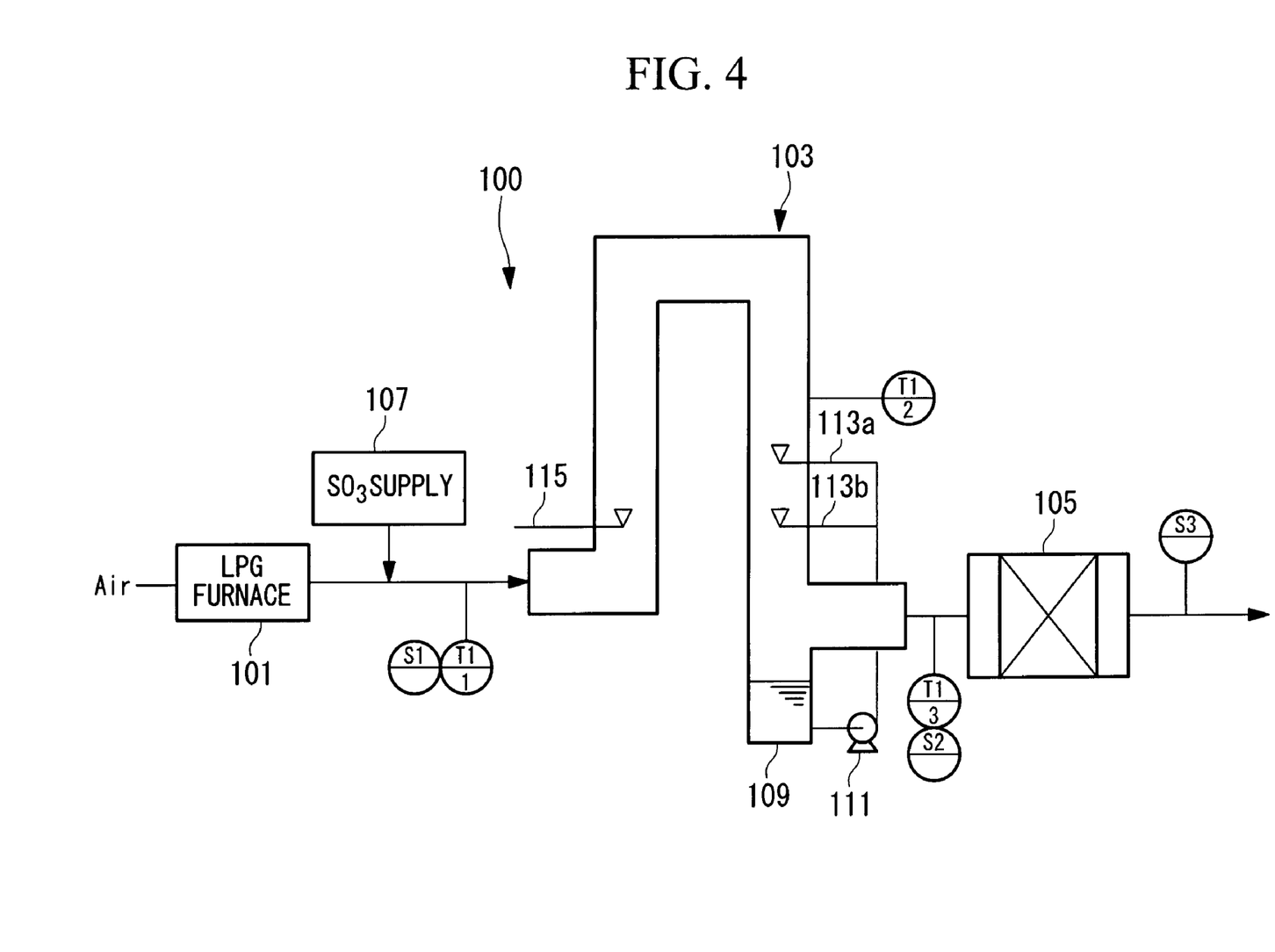
FIG. 4 is a schematic diagram showing a test apparatus whereby an $SO_3$ removal test was performed.
Figure 5:
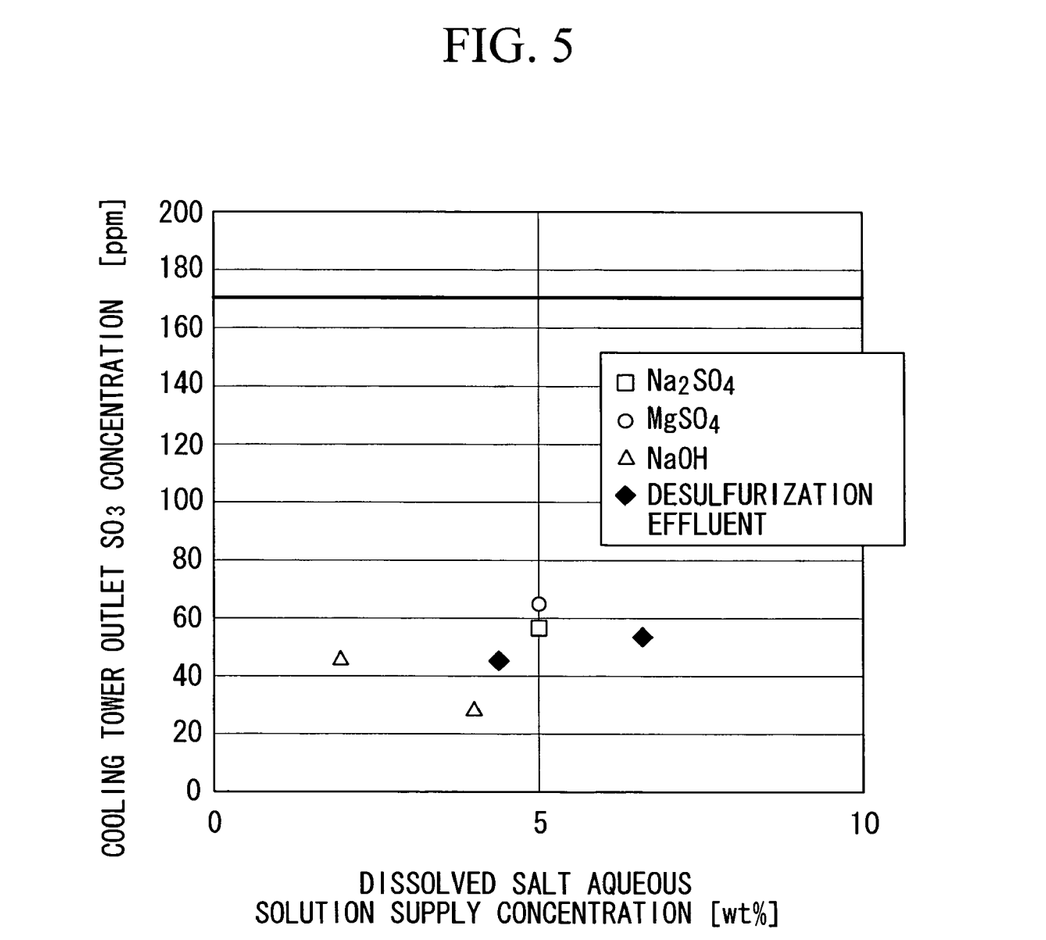
FIG. 5 is a graph showing test results of $SO_3$ removal.
Figure 6:
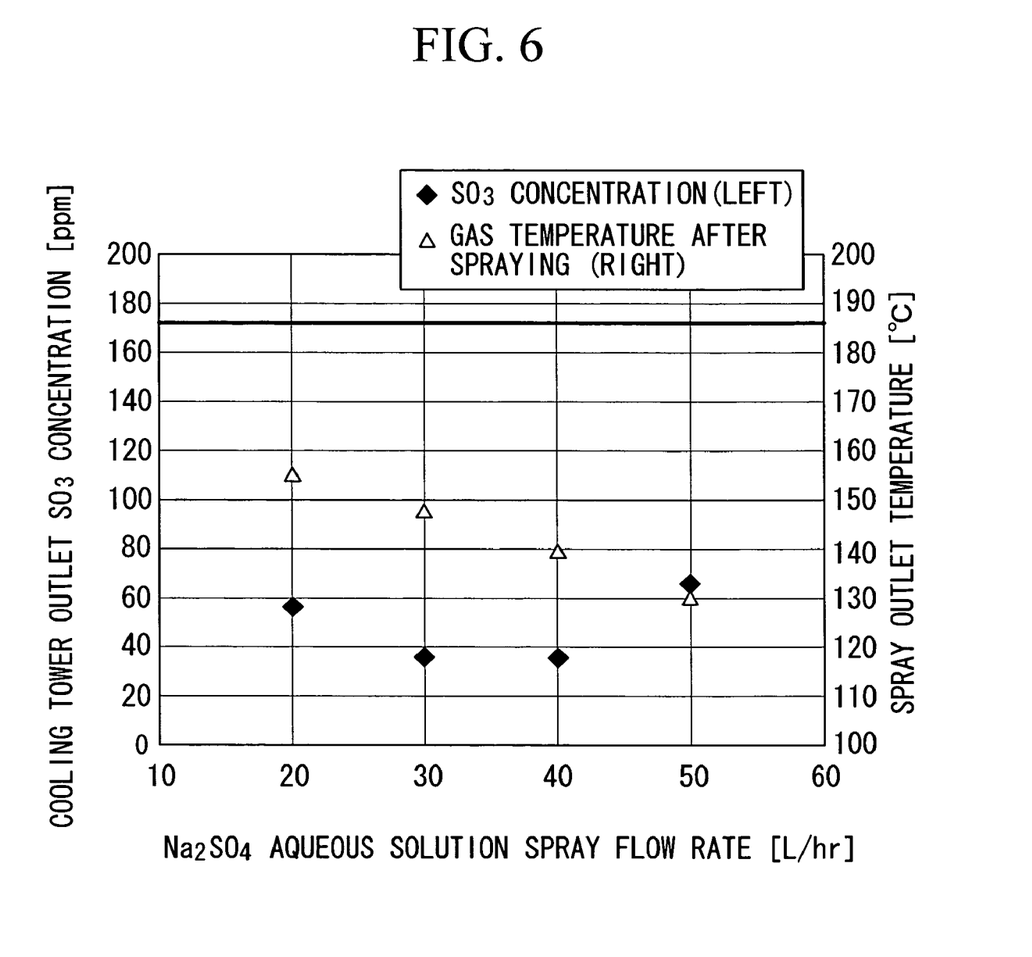
FIG. 6 is a graph showing test results of $SO_3$ removal.

A $SO_3$ removal test is described, with reference to FIG. 4 to FIG. 6.

FIG. 4 schematically shows a test apparatus.

The test apparatus 100 is provided with an LPG furnace 101, a cooling tower 103 provided on the downstream side of the LPG furnace, and a wet electrostatic precipitator 105 provided on the downstream side of the cooling tower 103.

The LPG furnace 101 is a combustion furnace for combusting liquefied petroleum gas, and the combustion exhaust gas of the liquefied petroleum gas is introduced into the cooling tower 103 on the downstream side.

The cooling tower 103 has an approximately 450 mm square flow passage, and a storage part 109 is provided on the downstream side thereof. The water stored in the storage part 109 is pumped up by a pump 111 and sprayed from two water sprays 113a and 113b. Water is supplied from the water spray 113a on the upstream side at 1.4 m³/h, and the volume flow rate (L/G) with respect to the gas flowing in the flow passage is 0.5. Water is supplied from the water spray 113b on the downstream side at 2.8 m³/h, and the volume flow rate (L/G) with respect to the gas flowing in the flow passage is 1.0.

A dissolved salt spray 115 which uses a two-fluid nozzle is provided on the upstream side of the cooling tower 103. Droplets approximately 20 μm in diameter are sprayed from the dissolved salt spray 115.

An $SO_3$ supply device 107 is provided between the LPG furnace 101 and the cooling tower 103, and an initial $SO_3$ concentration is adjusted thereby.

Temperature sensors are provided at the inlet of the cooling tower 103, on the upstream side of the water sprays 113a and 113b, and at the outlet of the cooling tower 103. Moreover $SO_2$ concentration sensors are provided at the inlet of the cooling tower 103, at the outlet of the cooling tower 103, and at the outlet of the electrostatic precipitator 105.

The test in the present example was performed under conditions with the temperature at the inlet of the cooling tower 103 at 185° C., and the $SO_3$ concentration at the inlet of the cooling tower 103 at 170 ppm.

FIG. 5 shows the results of the test which used the above test apparatus 100. In FIG. 5, the horizontal axis represents dissolved salt aqueous solution supply concentration (wt %), and the vertical axis represents $SO_3$ concentration at the outlet of the cooling tower 103 (ppm).

In the present example, an aqueous solution which used $Na_2SO_4$, MgSO4 and NaOH as the dissolved salts was used, and the sodium hydroxide method desulfurization effluent was used.

As shown in FIG. 5, when the initial $SO_3$ concentration adjusted by the $SO_3$ supply device 107 is 170 ppm, $SO_3$ can be removed to approximately 60 ppm or less using any one of the above aqueous solutions. Therefore, if a wet electrostatic precipitator or a dielectric flue gas treatment system having an $SO_3$ removal ratio of approximately 90% is provided on the downstream side, the $SO_3$ concentration can be reduced to a few ppm, and production of bluish smoke can be prevented.

FIG. 6 shows the test results of spraying 5 wt % $Na_2SO_4$ aqueous solution where its flow rate is changed. In the same diagram, the horizontal axis represents $Na_2SO_4$ aqueous solution spray flow rate (L/hr), the left axis represents $SO_3$ concentration at the outlet of the cooling tower 13 (ppm), and the right axis represents spray outlet temperature (° C.).

The test result shows that the spray outlet temperature drops in proportion to an increase in the $Na_2SO_4$ aqueous solution spray flow rate.

When the $Na_2SO_4$ aqueous solution spray flow rate is 50 (L/hr), that is, when the spray outlet temperature is approximately 130° C., the $SO_3$ concentration slightly exceeds 60 ppm. However, when the spray outlet temperature is 140° C., the $SO_3$ concentration drastically drops to 40 ppm or less. Therefore, when the spray temperature is 130° C. or more, or more preferably 140° C. or more, the $SO_3$ removal rate can be improved.

What is claimed is:

1. An exhaust gas treatment system for removing at least one of the group consisting of sulfur trioxide, hydrogen fluoride, hydrogen chloride, mercury chloride, hydrogen sulfide, and carbonyl sulfide from combustion exhaust gas, wherein
there is provided a spraying device which sprays an aqueous solution containing a dissolved salt of or a sulfate of any one of Na, K, Mg and Ca, into a flue through which said combustion exhaust gas flows.

2. An exhaust gas treatment system according to claim 1, comprising a wet desulfurization system, and
said aqueous solution is desulfurization effluent of said wet desulfurization system.

3. An exhaust gas treatment system according to claim 1, wherein an outlet temperature of said spraying device is 130° C.

4. An exhaust gas treatment system according to claim 1, provided with an air heater that heats air which is supplied to a combustion furnace, by an amount of heat obtained from combustion exhaust gas, and
said spraying device is provided on an upstream side of said air heater.

5. An exhaust gas treatment system according to claim 1, provided with: an air heater that heats air which is supplied to a combustion furnace, by an amount of heat obtained from combustion exhaust gas; and
a dry electrostatic precipitator provided on a downstream side of said air heater, and
said spraying device is provided between said air heater and said dry electrostatic precipitator.

6. An exhaust gas treatment system according to claim 1, provided with: an air heater that heats air which is supplied to a combustion furnace, by an amount of heat obtained from combustion exhaust gas;
a dry electrostatic precipitator provided on a downstream side of said air heater; and
a wet desulfurization system provided on a downstream side of said dry electrostatic precipitator, and
said spraying device is provided between said dry electrostatic precipitator and said wet desulfurization system, and in an immediate vicinity of said wet desulfurization system.

7. An exhaust gas treatment system according to claim 1, provided with: an air heater that heats air which is supplied to a combustion furnace, by an amount of heat obtained from combustion exhaust gas;
a dry electrostatic precipitator provided on a downstream side of said air heater; and
a wet desulfurization system provided on a downstream side of said dry electrostatic precipitator, and
said spraying device is provided in any of two places: on an upstream side of said air heater; between said air heater and said dry electrostatic precipitator; and between dry electrostatic precipitator and said wet desulfurization system, and in an immediate vicinity of said wet desulfurization system.

8. An exhaust gas treatment system according to claim 1, provided with a wet electrostatic precipitator or a dielectric flue gas treatment system.

9. An exhaust gas treatment method for removing at least one of the group consisting of sulfur trioxide, hydrogen fluoride, hydrogen chloride, mercury chloride, hydrogen sulfide, and carbonyl sulfide from combustion exhaust gas, comprising
spraying an aqueous solution containing a dissolved salt of a chloride or a sulfate of any one of Na, K, Mg and Ca, into a flue through which said combustion exhaust gas flows.

10. An exhaust gas treatment system according to claim 3, wherein an outlet temperature of said spraying device is preferably 140° C. or more.

* * * * *